(12) United States Patent
Urbank et al.

(10) Patent No.: US 6,669,550 B1
(45) Date of Patent: Dec. 30, 2003

(54) HEATING, VENTILATION, AND AIR CONDITIONING SYSTEM HAVING IMPROVED AIR WARM-UP

(75) Inventors: Thomas Martin Urbank, Lockport, NY (US); Karma Vir Sangwan, East Amherst, NY (US); Taylor R. Eckstein, Jr., N. Tonawanda, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/222,099

(22) Filed: Aug. 16, 2002

(51) Int. Cl.[7] .................................................. B60H 1/28
(52) U.S. Cl. ....................................... 454/156; 454/121
(58) Field of Search ................................. 454/121, 139, 454/156

(56) References Cited

U.S. PATENT DOCUMENTS

| | | | |
|---|---|---|---|
| 5,391,112 A | 2/1995 | Wardlaw | 454/139 |
| 5,709,601 A * | 1/1998 | Heck | 454/121 |
| 5,879,230 A | 3/1999 | Wardlaw et al. | 454/139 |
| 6,209,331 B1 | 4/2001 | Lake et al. | 62/180 |
| 6,244,952 B1 * | 6/2001 | Arold et al. | 454/145 |
| 6,304,803 B1 | 10/2001 | Dao | 701/36 |
| 6,314,949 B1 | 11/2001 | DeGrazia, Jr. et al. | 123/542 |
| 6,361,429 B1 | 3/2002 | Pawlak, III et al. | 454/139 |
| 6,381,973 B1 | 5/2002 | Bhatti et al. | 62/172 |
| 6,382,305 B1 | 5/2002 | Sano | 165/43 |
| 6,554,695 B2 * | 4/2003 | Elliot | 454/139 |

* cited by examiner

Primary Examiner—Gregory Wilson
(74) Attorney, Agent, or Firm—Patrick M. Griffin (57) ABSTRACT

A HVAC system is operable in a fresh air mode and a recirculation mode for use in a vehicle is disclosed. The HVAC system includes a blower and a HVAC module in fluid communication with and downstream of the blower for warming and cooling the air to be circulated through the passenger compartment in both the fresh air mode and the recirculation mode. The HVAC module includes an inlet duct in fluid communication with and upstream of the blower and located above the dashboard for drawing air from the passenger compartment above the dashboard and through the blower and the HVAC module in the recirculation mode. The inlet duct above the dashboard improves air circulation within the passenger compartment that improves the air warm-up rate. The inlet duct above the dashboard also improves the airflow across a windshield to prevent fogging of the windshield.

28 Claims, 8 Drawing Sheets

| Average Front Outlet Temperature | | | | |
|---|---|---|---|---|
| Time (Minutes) | Baseline | New Heater-Recirc | Discharge Temp Improvement | Percentage Temperature Improvement |
| 0 | 0.55 | 5.95 | 5.4 | |
| 5 | 63.05 | 77.95 | 14.9 | 23.63% |
| 10 | 102.55 | 124.8 | 22.25 | 21.70% |
| 15 | 125 | 150.1 | 25.1 | 20.08% |
| 20 | 121.45 | 158.25 | 36.8 | 30.30% |
| 25 | 123.7 | 161.25 | 37.55 | 30.36% |
| 30 | 125.8 | 164.4 | 38.6 | 30.68% |
| 35 | 128.3 | 165.85 | 37.55 | 29.27% |
| 40 | 129.55 | 167.05 | 37.5 | 28.95% |

| | Average Front Temperature | | | |
|---|---|---|---|---|
| Time (Minutes) | Baseline | New Heater-Recirc | Front Floor Temp Improvement | Percentage Temperature Improvement |
| 0 | 1.7 | 3.85 | 2.15 | |
| 5 | 28.85 | 34.95 | 6.1 | 21.14% |
| 10 | 52.45 | 59.4 | 6.95 | 13.25% |
| 15 | 68.55 | 77.8 | 9.25 | 13.49% |
| 20 | 75.2 | 87.2 | 12 | 15.96% |
| 25 | 80 | 94.6 | 14.6 | 18.25% |
| 30 | 85 | 99.3 | 14.3 | 16.82% |
| 35 | 89.05 | 103.55 | 14.5 | 16.28% |
| 40 | 91.95 | 107.2 | 15.25 | 16.59% |

HEATING, VENTILATION, AND AIR CONDITIONING SYSTEM HAVING IMPROVED AIR WARM-UP

BACKGROUND OF THE INVENTION

1. Field of the Invention

The subject invention relates to a heating, ventilation, and air conditioning (HVAC) system being operable in a fresh air mode and a recirculation mode for use in a vehicle having a passenger compartment with a front and a back and having a dashboard located in the front of the passenger compartment.

2. Description of the Related Art

Various heating, ventilation, and air conditioning (HVAC) systems being operable in a fresh air mode and a recirculation mode are known to those skilled in the art. These HVAC systems are used in vehicles having a passenger compartment with a front and a back. These vehicles include a dashboard located in the front of the passenger compartment. A blower is in fluid communication with the passenger compartment for circulating air from outside the vehicle into and through the passenger compartment in the fresh air mode and for recirculating air from within the passenger compartment in the recirculation mode. The systems also include a heating, ventilation, and air conditioning (HVAC) module in fluid communication with and downstream of the blower for warming and cooling the air to be circulated through the passenger compartment in both the fresh air mode and the recirculation mode. The blower has a first inlet duct for drawing air from outside the vehicle and a second inlet duct for drawing air from within the vehicle. The HVAC module has outlets for venting the air into the vehicle. Typically, there is a defrost duct venting air out above the dashboard, a panel outlet venting air out the front of the dashboard, and a floor outlet venting air out below the dashboard.

When the HVAC system is operated in fresh air mode, air enters the vehicle through the first inlet duct and is vented through the outlets. The air exits the vehicle from the rear providing continuously fresh air throughout the passenger compartment. In recirculation mode, air is drawn from within the vehicle through the second inlet duct below the dashboard. The air is vented back into the vehicle through the outlets. However, in recirculation mode, when the air is vented through the floor outlets, the air is immediately drawn back into the second inlet duct. This short circuits the airflow within the passenger compartment and prevents the air from circulating through the entire passenger compartment. Therefore, additional time is required to obtain a desired temperature of the air and vent the air throughout the passenger compartment.

It would be advantageous to provide a HVAC system that continues to circulate air throughout the passenger compartment while in recirculation mode. It would also be advantageous to provide the HVAC system having an improved warm-up rate of air within the passenger compartment while operating in the recirculation mode. Further, it would be advantageous to provide an HVAC system that has improved airflow across a windshield of the vehicle to prevent fogging of the windshield.

BRIEF SUMMARY OF THE INVENTION AND ADVANTAGES

The subject invention provides a vehicle having a heating, ventilation, and air conditioning (HVAC) system being operable in a fresh air mode and a recirculation mode. The vehicle includes a passenger compartment having a front and a back and a dashboard located in the front of the passenger compartment. The HVAC system includes a blower in fluid communication with the passenger compartment for circulating air from outside the vehicle into and through the passenger compartment in the fresh air mode and for recirculating air from within the passenger compartment in the recirculation mode. The HVAC system further includes a heating, ventilation, and air conditioning (HVAC) module in fluid communication with and downstream of the blower for warming and cooling the air to be circulated through the passenger compartment in both the fresh air mode and the recirculation mode. The system includes an inlet duct in fluid communication with and upstream of the blower and located above the dashboard for drawing air from the passenger compartment above the dashboard and through the blower and the HVAC module in the recirculation mode.

While in recirculation mode, air is being vented into the passenger compartment through the floor outlets and drawn into the inlet duct located above the dashboard. This forces the air to flow up and around the dashboard and throughout the passenger compartment. The inlet duct above the dashboard does not create a short circuit in the airflow within the passenger compartment during recirculation mode. By forcing the air to flow throughout the passenger compartment, the air has an improved warm up rate, which improves the level of the occupant's comfort. The inlet duct above the dashboard also improves the flow of air across a windshield of the vehicle to prevent fogging of the windshield.

BRIEF DESCRIPTION OF THE SEVERAL VIEW OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
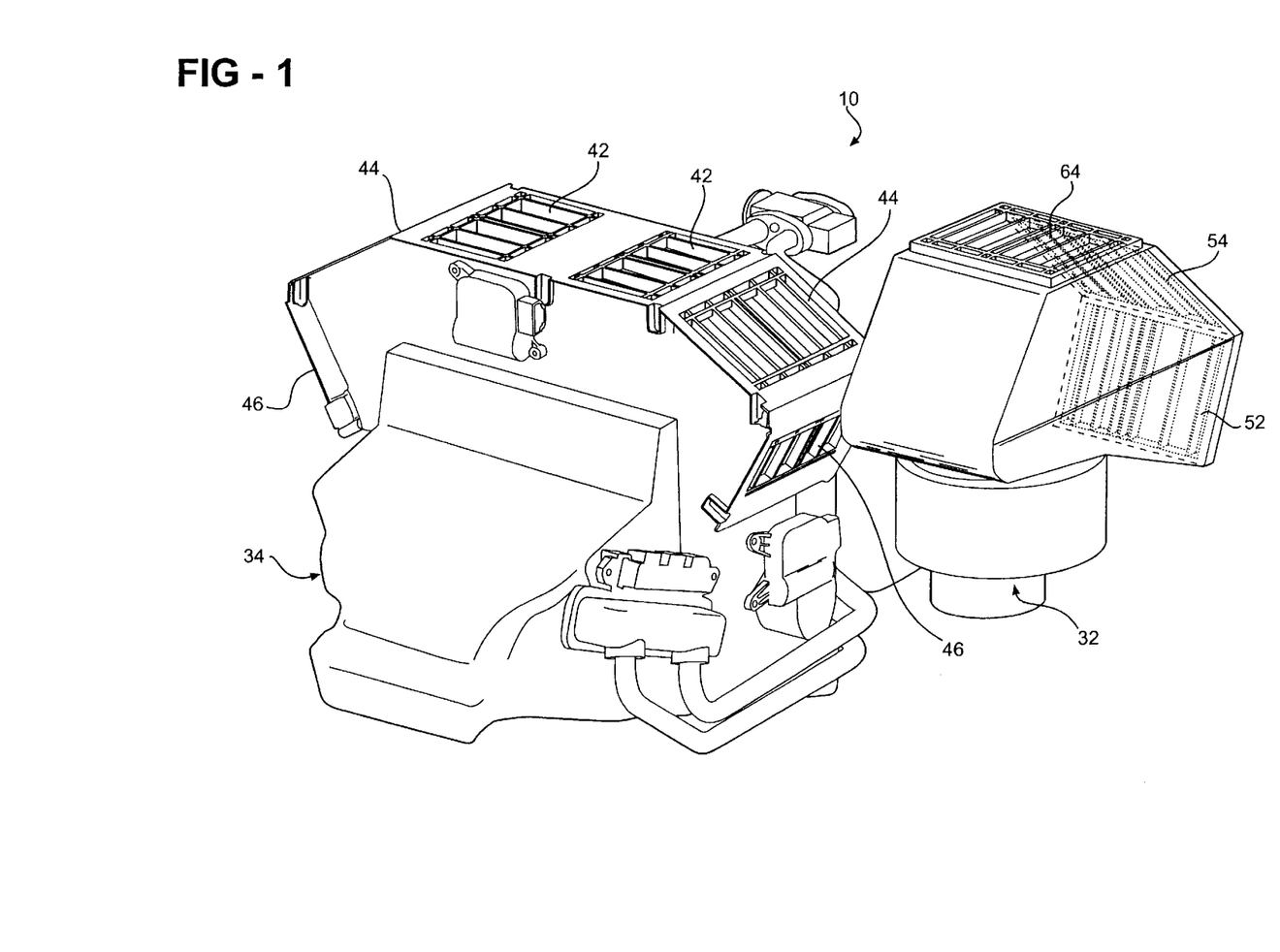
FIG. 1 is a perspective view of a heating, ventilation, and air conditioning (HVAC) module according to the subject invention.

Referring to the Figures, wherein like numerals indicate like or corresponding parts throughout the several views, a heating, ventilation, and air conditioning (HVAC) system is generally shown at 10 in FIG. 1. The HVAC system 10 is operable in a fresh air mode and a recirculation mode. The HVAC system 10 draws air from outside a vehicle 12 and vents the air into the vehicle 12 in the fresh air mode. The HVAC system 10 also draws air from within the vehicle 12 and recirculates the air back into the vehicle 12 in the recirculation mode. It is to be appreciated that HVAC systems may be able to simultaneously mix the fresh, ambient air and the recirculated air.

Figure 2:
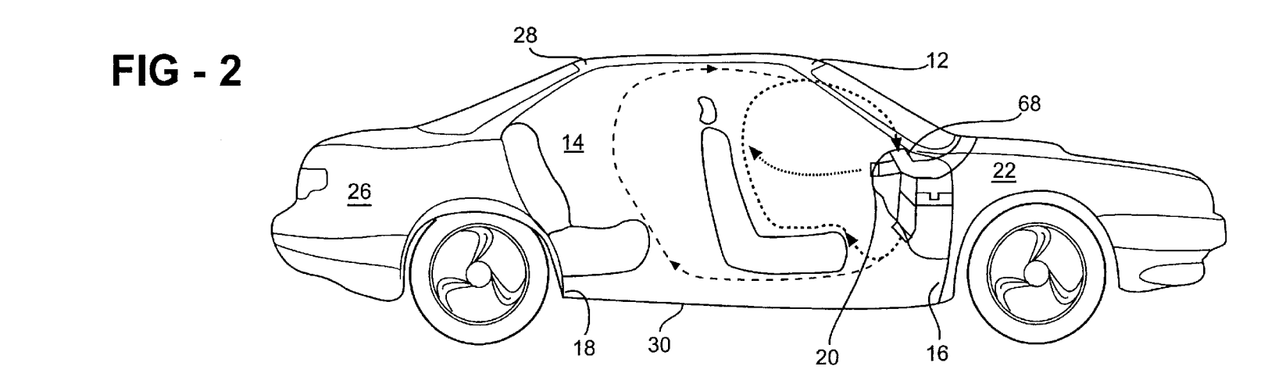
FIG. 2 is a side view of a vehicle having a HVAC system according to the subject invention.

Referring to FIG. 2, the vehicle 12 includes a passenger compartment 14 having a front 16 and a back 18. A dashboard 20 is located in the front 16 of the passenger compartment 14. The vehicle 12 has an engine compartment 22 located at the front 16 of the vehicle 12. The terms "front" and "back" are intended to be very general, and the structures that define and delimit the front 16 and back 18 will, in any particular case, differ. Typically, the front 16 would be defined by those structures in front 16 of a front seat passenger or driver, such as a windshield, the dashboard 20, and the like. The back 18 would be defined by structures such as a shelf behind the back passengers and whatever structure separates the back seating from a trunk space 26. The passenger compartment 14 is bounded above by a roof structure 28 and below by a floor 30. Terms such as "front"and "back"are intended here to be inclusive, rather than exclusive, and relate more to the air movement inside the passenger compartment 14, than to its structural features. That is, air will move generally from front 16 to back 18, in the fresh air mode, and will circulate back again generally from back 18 to front 16 in the recirculation mode.

The HVAC system 10 includes a blower 32, shown in FIG. 1, mounted in either the back of the engine compartment 22 or adjacent the dashboard 20, as is known in the art of HVAC systems. The blower 32 is in fluid communication with the passenger compartment 14 for circulating air from outside the vehicle 12 into and through the passenger compartment 14 in the fresh air mode and for recirculating air from within the passenger compartment 14 in the recirculation mode. The blower 32 will be described in more detail below.

Figure 3:
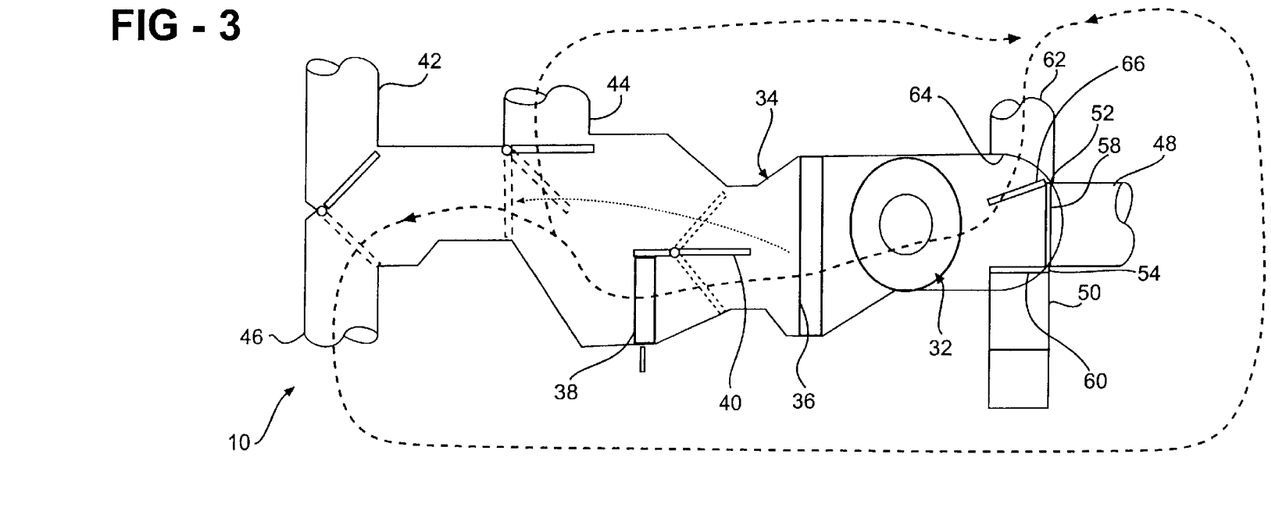
FIG. 3 is a side of the HVAC module of FIG. 1.

Referring to FIGS. 1 and 3, the HVAC system 10 further includes a heating, ventilation, and air conditioning (HVAC) module 34 in fluid communication with and downstream of the blower 32 for warnring and cooling the air to be circulated through the passenger compartment 14 in both the fresh air mode and the recirculation mode. The HVAC module 34 includes an evaporator 36, a heater core 38, and a temperature door 40, as is known in the art. The temperature door 40 is moveable to select the amount of air that flows through the heater core 38, as understood by those skilled in the art. The HVAC module shown in FIG. 1 is a dual zone HVAC module that allow the driver and the passenger to select different temperatures. The subject invention is equally applicable with a single zone HVAC module or a dual mode HVAC module as known by those skilled in the art.

The HVAC module 34 has outlets for venting the air into the vehicle 12. One outlet is a defrost duct 42 located in fluid communication with and downstream of the HVAC module 34 and adapted to be located above the dashboard 20 for venting the air into the passenger compartment 14. The defrost ducts 42 vent air from the HVAC system 10 into the passenger compartment 14. The defrost ducts 42 are typically located just below the windshield on the dashboard 20 to prevent fogging of the windshield. A second outlet is a panel outlet 44 venting air out the front 16 of the dashboard 20, and a third outlet is a floor outlet 46 venting air out below the dashboard 20.

The HVAC module 34 includes a first inlet duct 48 in fluid communication with and upstream of the blower 32 for drawing ambient air from outside of the passenger compartment 14 and through the blower 32 and the HVAC module 34 in the fresh air mode. The HVAC module 34 further includes a second inlet duct 50 in fluid communication with and upstream of the blower 32 and adapted to be located below the dashboard 20 for drawing air from below the dashboard 20 in the passenger compartment 14 and through the blower 32 and the HVAC module 34 in the recirculation mode. Inlet ducts channel the flow of the air from either outside or inside the vehicle to the blower, as is known to those skilled in the art. The inlet ducts may be rectangular or circular depending upon the amount of space where the module is located in either the engine compartment or the passenger compartment.

Figure 4:
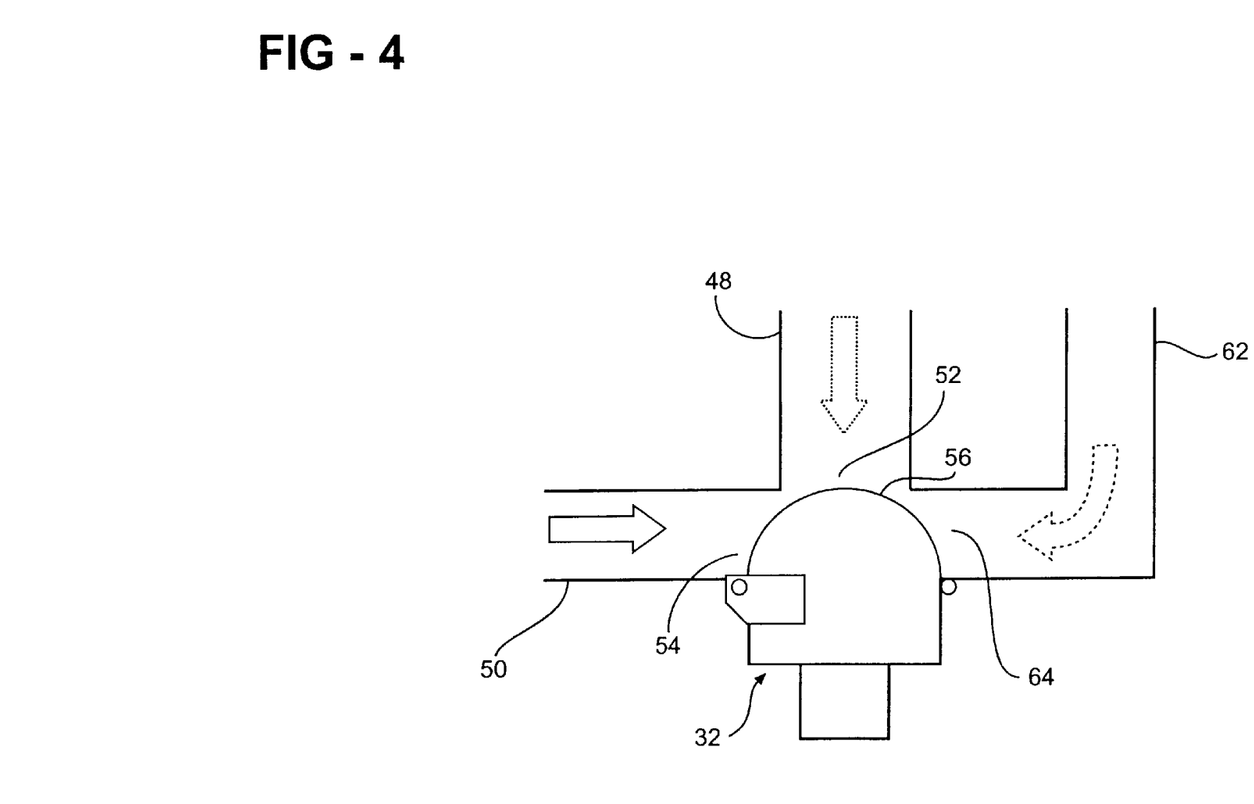
FIG. 4 is side view of a blower having three inlet ducts according to the subject invention.

The blower 32 includes a first blower port 52 interconnecting the first inlet duct 48 and the blower 32 and a second blower port 54 interconnecting the second inlet duct 50 and the blower 32. The blower ports are typically apertures in the blower for connecting the inlet ducts to the blower. It should be understood that any connection of the inlet ducts to the blower would accomplish the subject invention. A blower door 56 is connected to the blower 32 and is moveable between an open position and a closed position for selectively opening and closing the blower 32 ports. In one embodiment, shown in FIG. 4, the blower door 56 is single door. It is preferable that the blower door 56 is further defined as a first blower door 58 for opening and closing the first blower port 52 and a second blower door 60 for opening and closing the second blower port 54, as best shown in FIG. 3.

The system 10 includes a third inlet duct 62 in fluid communication with and upstream of the blower 32 and located above the dashboard 20 for drawing air from the passenger compartment 14 above the dashboard 20 and through the blower 32 and the HVAC module 34 in the recirculation mode. The third inlet duct is preferably of the same construction as that of the first and second inlet ducts. The blower 32 has a third blower port 64 interconnecting the third inlet duct 62 and the blower 32. A third blower door 66 is utilized for opening and closing the third blower port 64, when multiple blower doors are used in place of the single blower door described above.

The subject invention may further include a dashboard port 68 located on the dashboard 20. The dashboard port is an aperture in the dashboard such that the third inlet duct 62 and the defrost duct 42 share the dashboard port 68 for drawing the air from the passenger compartment 14 and venting the air back 18 into the passenger compartment 14. It is to be appreciated that multiple dashboard ports 68 may be positioned within the passenger compartment 14, such as a first dashboard port adapted to be located on the dashboard 20 of a driver side of the vehicle 12 and a second dashboard port adapted to be located on the dashboard 20 of a passenger side of the vehicle 12.

Figure 5:
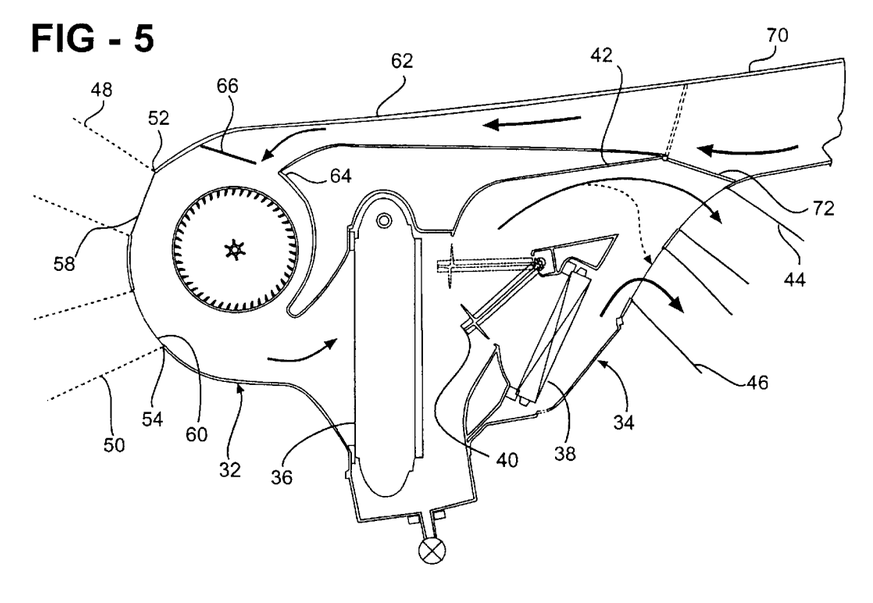
FIG. 5 is a side view of an alternate embodiment of the HVAC module of FIG. 1.

Referring to FIG. 5, the inlet duct 62 and the defrost duct 42 converge into a single duct 70. The single duct 70 is in fluid communication with the dashboard port 68. A door 72 is positioned within the single duct 70 and is moveable between an inlet mode for communicating the single duct 70 with the inlet duct and the blower 32 and an outlet mode for communicating the single duct 70 with the defrost duct 42 and the HVAC module 34. When the door is in the inlet mode, the single duct 70 delivers air through the blower 32 and to the HVAC module 34. The air is then discharged from the HVAC module 34 through another outlet other than the single vent.

Figure 6:
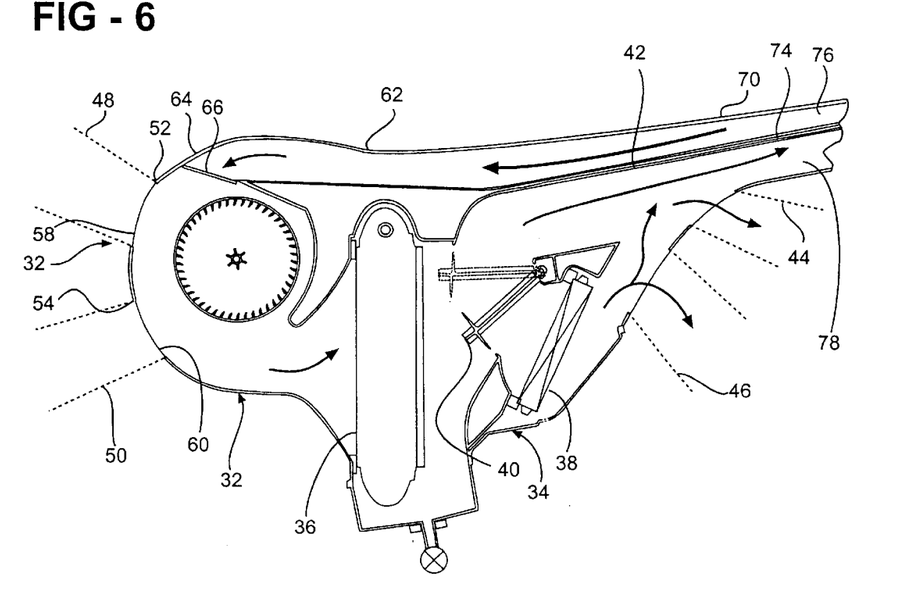
FIG. 6 is a side view of another embodiment of the HVAC module of FIG. 1.

Referring to FIG. 6, in another embodiment, the single duct 70 may be used for both the recirculation and venting the air back into the passenger compartment 14. In this embodiment, a baffle 74 extends along the single duct 70 and divides the single duct 70. The single duct 70 is divided into a first chamber 76 for drawing air in through the dashboard port 68 to the inlet duct and the blower 32 and a second chamber 78 for venting air from the HVAC module 34 out through the defrost duct 42 and the dashboard port 68.

Referring back to FIGS. 2 and 3, when the HVAC system 10 is operated in fresh air mode, air enters the vehicle 12 through the first inlet duct 48 and vented through the outlets. The air exits the vehicle 12 from the rear thereby providing continuous fresh air throughout the passenger compartment 14. In recirculation mode, air is drawn from within the vehicle 12 through either the second inlet duct 50 below the dashboard 20 or through the third inlet duct 62 above the dashboard 20, or a mix of air from both the second inlet and the third inlet ducts 50, 62. The air is then vented back into the vehicle 12 through the outlets 42, 44, 46. When the air is vented through the floor outlets 46 and drawn through the second outlet duct 50, the airflow is short-circuited. The short circuit only warms the air below the dashboard 20 and does not warm the remaining passenger compartment 14. However, when the air is being vented into the passenger compartment 14 through the floor outlets 46 and drawn into the inlet duct 62 located above the dashboard 20, the airflow is not short-circuited. The air is forced to flow up and around the dashboard 20 and throughout the passenger compartment 14. By forcing the air to flow throughout the passenger compartment 14, the air has an improved warm up rate, which improves the level of the occupant's comfort.

Figure 7A:
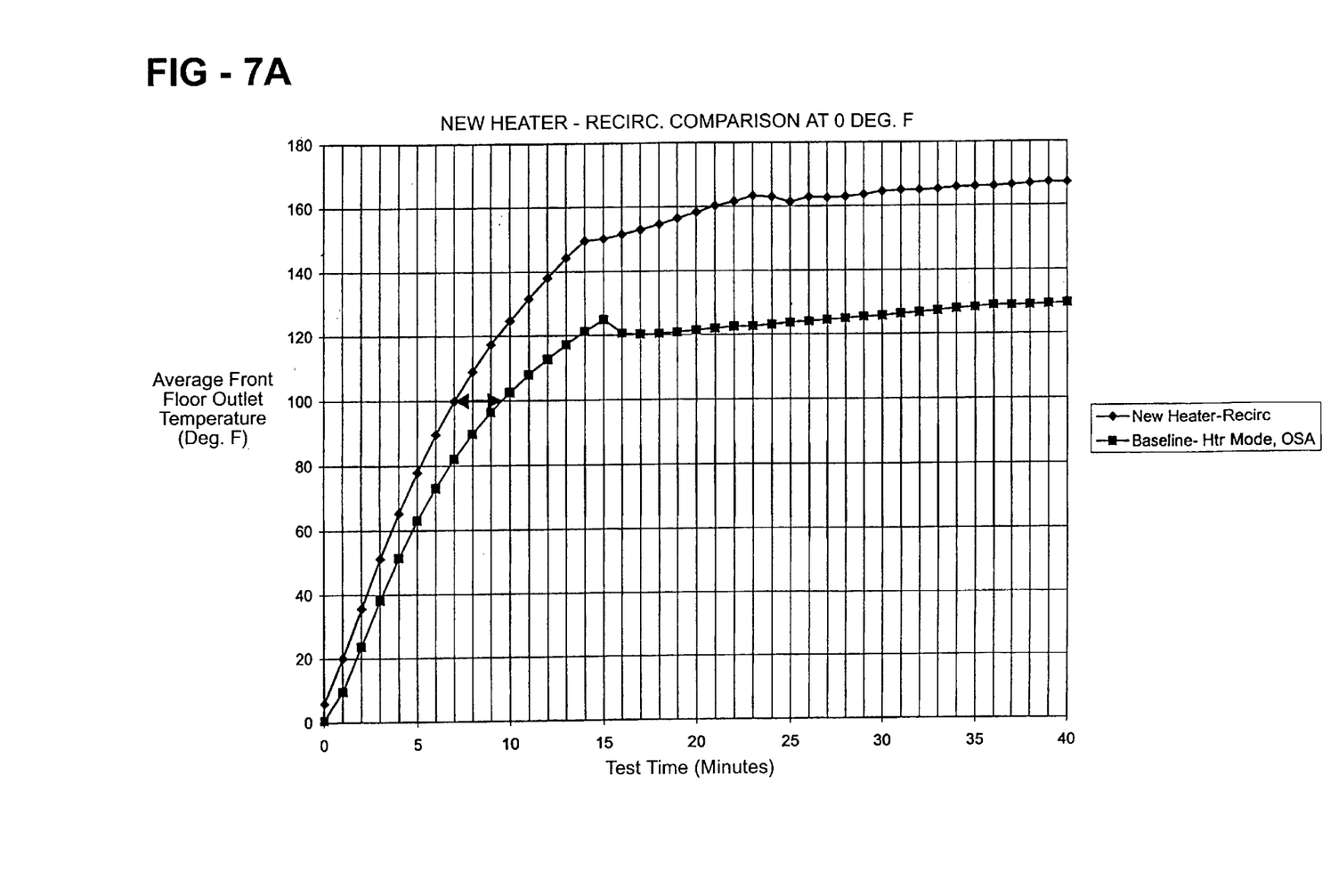
FIG. 7A is a graphical representation of an average outlet temperature of the HVAC module versus time for the subject invention.
Figure 7B:
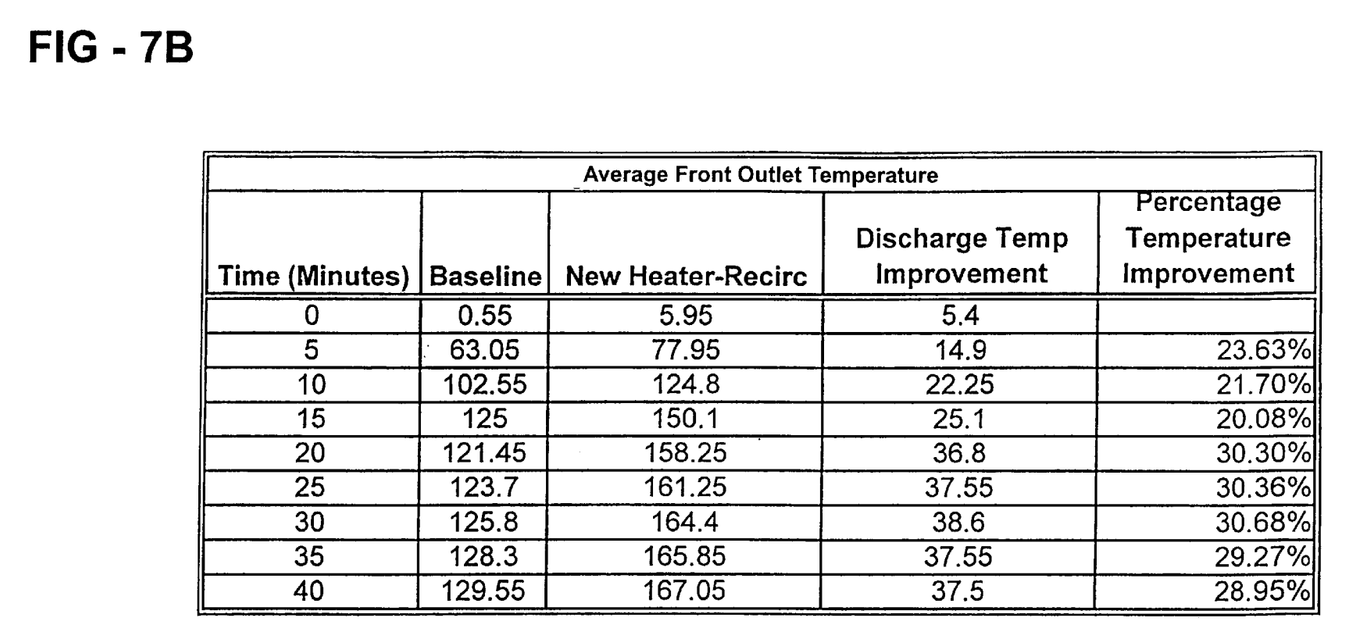
FIG. 7B is a tabular representation of the average outlet temperature of the HVAC module versus time and a temperature improvement for the subject invention.

For example and with reference to FIG. 7A, a graph of time versus temperature of air coming out of the floor outlets 46 is illustrated. A first line, a baseline, is shown for an ordinary system 10 having only a first inlet for ambient air and a second inlet below the dashboard 20 for recirculation. A second line is shown for the system 10 of the subject invention drawing air through the third inlet. At the 10-minute mark, the ordinary system 10 has an average air temperature just after the floor outlet 46 of 102.55 degrees Fahrenheit. The subject invention at the 10-minute mark has an average air temperature of 124.8 degrees Fahrenheit. The subject invention has increased the temperature by 21.7%. The ordinary system 10 takes 9.6 minutes to reach 100 degrees Fahrenheit, while the subject invention system 10 takes only 7.0 minutes. This improves the warm-up rate of the air by 27%. Additional results are shown graphically in FIG. 7A and in a tabular format in FIG. 7B.

Figure 8A:
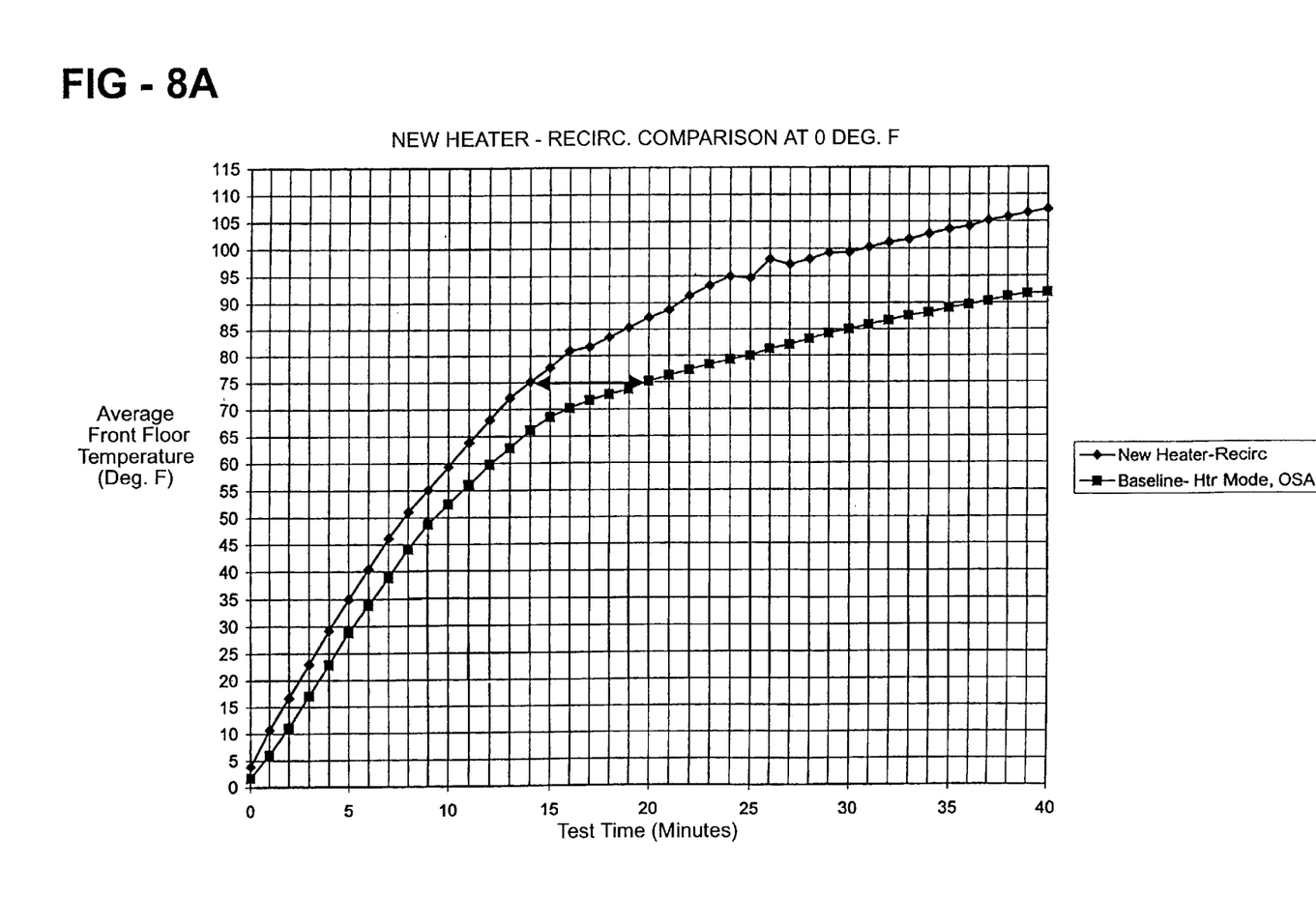
FIG. 8A is a graphical representation of a floor outlet temperature of the HVAC module versus time for the subject invention.
Figure 8B:
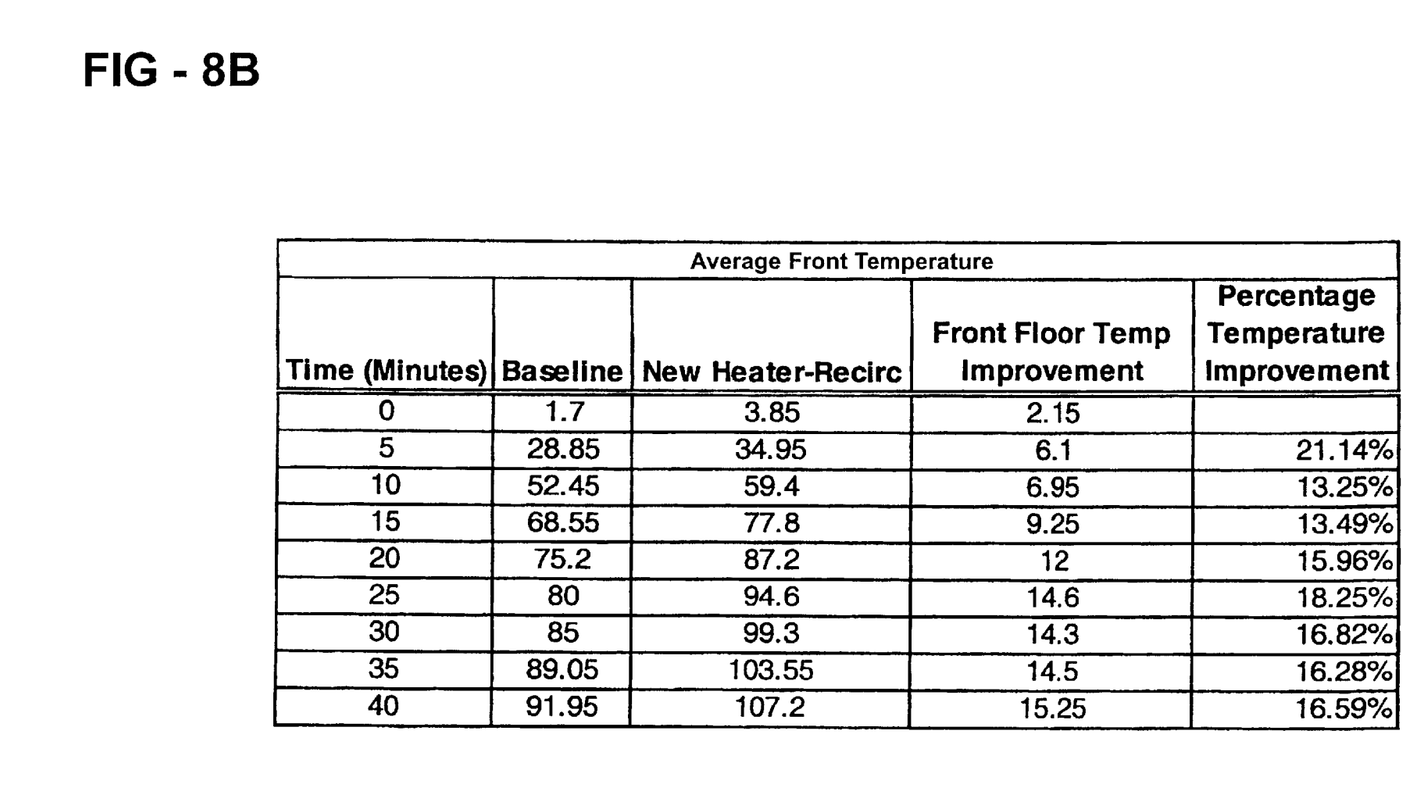
FIG. 8B is a tabular representation of the floor outlet temperature of the HVAC module versus time and a temperature improvement for the subject invention.

Referring to FIG. 8A, a graph of time versus temperature of air about 8–16 inches away from the floor outlets 46 after the air has mixed with the air in the passenger compartment is illustrated. A first line, the baseline, is shown for an ordinary system 10 having only a first inlet for ambient air and a second inlet below the dashboard 20 for recirculation. A second line is shown for the system 10 of the subject invention drawing air through the third inlet. At the 10-minute mark, the ordinary system 10 has an average air temperature within the passenger compartment about 8–16 inches from the floor outlets 46 of 52.45 degrees Fahrenheit. The subject invention at the 10-minute mark has an average air temperature of 59.4 degrees Fahrenheit. The subject invention has increased the temperature by 13.25%. The ordinary system 10 takes 20 minutes to reach 75 degrees Fahrenheit, while the subject invention system 10 takes only 14 minutes. This improves the warm-up rate of the air by 30%. Additional results are shown graphically in FIG. 8A and in a tabular format in FIG. 8B.

Obviously, many modifications and variations of the present invention are possible in light of the above teachings. The invention may be practiced otherwise than as specifically described within the scope of the appended claims.

What is claimed is:

1. A vehicle having a heating, ventilation, and air conditioning (HVAC) system being operable in a fresh air mode and a recirculation mode, said vehicle comprising:

a passenger compartment having a front and a back;

a dashboard located in said front of said passenger compartment;

a blower in fluid communication with said passenger compartment for circulating air from outside said vehicle into and through said passenger compartment in the fresh air mode and for recirculating air from within said passenger compartment in the recirculation mode;

a heating, ventilation, and air conditioning (HVAC) module in fluid communication with and downstream of said blower for warming and cooling the air to be circulated through said passenger compartment in both the fresh air mode and the recirculation mode; and an inlet duct in fluid communication with and upstream of said blower and located above said dashboard for drawing air from said passenger compartment above said dashboard and through said blower and said HVAC module in the recirculation mode.

2. A system as set forth in claim 1 further comprising a defrost duct located in fluid communication with and downstream of said HVAC module and located above said dashboard for venting the air into said passenger compartment.

3. A system as set forth in claim 2 further comprising a dashboard port located on said dashboard such that said inlet duct and said defrost duct share said dashboard port for drawing the air from said passenger compartment and venting the air back into said passenger compartment.

4. A system as set forth in claim 3 wherein said inlet duct and said defrost duct converge into a single duct in fluid communication with said dashboard port.

5. A system as set forth in claim 4 further comprising a door within said single duct moveable between an inlet mode for communicating said single duct with said inlet duct and said blower and an outlet mode for communicating said single duct with said defrost duct and said HVAC module.

6. A system as set forth in claim 4 further comprising a baffle extending along said single duct and dividing said single duct into a first chamber for drawing air in through said dashboard port to said inlet duct and said blower and a second chamber for venting air from said HVAC module out through said defrost duct and said dashboard port.

7. A heating, ventilation, and air conditioning (HVAC) system being operable in a fresh air mode and a recirculation mode for use in a vehicle having a passenger compartment with a front and a back and having a dashboard located in the front of the passenger compartment, said system comprising:

a blower for circulating air from outside the vehicle into and through the passenger compartment in the fresh air mode and for recirculating air within the passenger compartment in the recirculation mode;

a heating, ventilation, and air conditioning (HVAC) module in fluid communication with said blower for warming and cooling the air to be circulated through the passenger compartment in both the fresh air mode and the recirculation mode;

a first inlet duct in fluid communication with and upstream of said blower for drawing ambient air from outside of the passenger compartment and through said blower and said HVAC module in the fresh air mode;

a second inlet duct in fluid communication with and upstream of said blower and adapted to be located below the dashboard for drawing air from below the dashboard in the passenger compartment and through said blower and said HVAC module in the recirculation mode; and a third inlet duct in fluid communication with and upstream of said blower and adapted to be located above the dashboard for drawing air from above the dashboard in the passenger compartment and through said blower and said HVAC module in the recirculation mode.

8. A system as set forth in claim 7 wherein said blower further comprises a first blower port interconnecting said first inlet duct and said blower, a second blower port interconnecting said second inlet duct and said blower, and a third blower port interconnecting said third inlet duct and said blower.

9. A system as set forth in claim 8 further comprising a blower door moveable between an open position and a closed position for selectively opening and closing said first, second, and third blower ports.

10. A system as set forth in claim 9 wherein said blower door is single door.

11. A system as set forth in claim 9 wherein said blower door is further defined as a first blower door for opening and closing said first blower port, a second blower door for opening and closing said second blower port, a third blower door for opening and closing said third blower port.

12. A system as set forth in claim 7 further comprising a defrost duct located in fluid communication with and downstream of said HVAC module and adapted to be located above the dashboard for venting the air into the passenger compartment.

13. A system as set forth in claim 12 further comprising a dashboard port adapted to be located on the dashboard such that said third inlet duct and said defrost duct share said dashboard port for drawing the air from the passenger compartment and venting the air back into the passenger compartment.

14. A system as set forth in claim 13 wherein said third inlet duct and said defrost duct converge into a single duct in fluid communication with said dashboard port.

15. A system as set forth in claim 14 further comprising a door within said single duct moveable between an inlet mode for communicating said single duct with said third inlet duct and said blower and an outlet mode for communication said single duct with said defrost duct and said HVAC module.

16. A system as set forth in claim 14 further comprising a baffle extending along said single duct and dividing said single duct into a first chamber for drawing air in through said dashboard port to said third inlet duct and said blower and a second chamber for venting air from said HVAC module out through said defrost duct and said dashboard port.

17. A system as set forth in claim 13 further comprising a first dashboard port adapted to be located on the dashboard of a driver side of the vehicle and a second dashboard port adapted to be located on the dashboard of a passenger side of the vehicle.

18. A vehicle having a heating, ventilation, and air conditioning (HVAC) system being operable in a fresh air mode and a recirculation mode, said vehicle comprising:

a passenger compartment having a front and a back;

a dashboard located in said front of said passenger compartment;

a blower in fluid communication with said passenger compartment for circulating air from outside said vehicle into and through said passenger compartment in the fresh air mode and for recirculating air from within said passenger compartment in the recirculation mode;

a heating, ventilation, and air conditioning (HVAC) module in fluid communication with and downstream of said blower for warming and cooling the air to be circulated through said passenger compartment in both the fresh air mode and the recirculation mode;

a first inlet duct in fluid communication with and upstream of said blower for drawing ambient air from outside of said passenger compartment and through said blower and said HVAC module in the fresh air mode;

a second inlet duct in fluid communication with and upstream of said blower and located below said dashboard for drawing air from said passenger compartment below said dashboard and through said blower and said HVAC module in recirculation mode; and a third inlet duct in fluid communication with and upstream of said blower and located above said dashboard for drawing air from said passenger compartment above said dashboard and through said blower and said HVAC module in recirculation mode.

19. A system as set forth in claim 18 wherein said blower further comprises a first blower port interconnecting said first inlet duct and said blower, a second blower port interconnecting said second inlet duct and said blower, and a third blower port interconnecting said third inlet duct and said blower.

20. A system as set forth in claim 19 further comprising a blower door moveable between an open position and a closed position for selectively opening and closing said first, second, and third blower ports.

21. A system as set forth in claim 20 wherein said blower door is single door.

22. A system as set forth in claim 20 wherein said blower door is further defined as a first blower door for opening and closing said first blower port, a second blower door for opening and closing said second blower port, a third blower door for opening and closing said third blower port.

23. A system as set forth in claim 18 further comprising a defrost duct located in fluid communication with and downstream of said HVAC module and located above said dashboard for venting the air into said passenger compartment.

24. A system as set forth in claim 23 further comprising a dashboard port located on said dashboard such that said third inlet duct and said defrost duct share said dashboard port for drawing the air from said passenger compartment and venting the air back into said passenger compartment.

25. A system as set forth in claim 24 wherein said third inlet duct and said defrost duct converge into a single duct in fluid communication with said dashboard port.

26. A system as set forth in claim 25 further comprising a door within said single duct moveable between an inlet mode for communicating said single duct with said third inlet duct and said blower and an outlet mode for communicating said single duct with said defrost duct and said HVAC.

27. A system as set forth in claim 25 further comprising a baffle extending along said single duct and dividing said single duct into a first chamber for drawing air in through said dashboard port to said third inlet duct and said blower and a second chamber for venting air from said HVAC module out through said defrost duct and said dashboard port.

28. A system as set forth in claim 24 further comprising a first dashboard port located on said dashboard of a driver side of said vehicle and a second dashboard port located on said dashboard of a passenger side of said vehicle.

* * * * *